(12) United States Patent
Aso

(10) Patent No.: US 8,272,855 B2
(45) Date of Patent: Sep. 25, 2012

(54) VALVE AND INFUSION DEVICE HAVING THE SAME

(75) Inventor: Yoshiaki Aso, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 677 days.

(21) Appl. No.: 12/251,677

(22) Filed: Oct. 15, 2008

(65) Prior Publication Data

US 2009/0162227 A1    Jun. 25, 2009

(30) Foreign Application Priority Data

Dec. 20, 2007   (JP) ................................ 2007-329264

(51) Int. Cl.
*A61M 1/00* (2006.01)
*F16K 1/00* (2006.01)
(52) U.S. Cl. ..................... 417/437; 251/324; 251/215
(58) Field of Classification Search ................. 417/437; 251/324, 215, 218, 264, 266, 291, 292
See application file for complete search history.

(56) References Cited

U.S. PATENT DOCUMENTS

| | | | | |
|---|---|---|---|---|
| 3,612,478 A | * | 10/1971 | Blazek | 251/145 |
| 4,617,957 A | * | 10/1986 | Sandling | 137/315.26 |
| 6,014,984 A | * | 1/2000 | Schmitz et al. | 137/315.01 |

FOREIGN PATENT DOCUMENTS

| | | |
|---|---|---|
| JP | 61-23566 | 2/1986 |
| JP | 07-83400 | 3/1995 |
| JP | 09-32937 | 2/1997 |

OTHER PUBLICATIONS

Japanese Examination Report of Japan Application No. 2007-329264, dated Dec. 6, 2011.

* cited by examiner

*Primary Examiner* — Anh Mai
*Assistant Examiner* — Elmito Breval
(74) *Attorney, Agent, or Firm* — J.C. Patents

(57) ABSTRACT

Operability and lifespan of a drain valve of an operated infusion device are improved when changing the composition of a transported solution or releasing the pressure. A sealing portion and a shaft portion of the valve are constructed to be separated from each other. The shaft portion is disposed with a through hole having a step. A screw passes through the through hole, such that a screw portion of the screw is screwed to the sealing portion, and on the other hand, a screw head is fastened to the step portion of the through hole of the shaft portion. The sealing portion and the shaft portion can ensure a degree of freedom of rotation while maintaining a fixed position relationship there-between, thereby preventing the sealing portion from falling off and prolonging the lifespan of a valve body.

4 Claims, 2 Drawing Sheets (a)

(b)

VALVE AND INFUSION DEVICE HAVING THE SAME

CROSS-REFERENCE TO RELATED APPLICATION

This application claims the priority benefit of Japan application serial no. 2007-329264, filed Dec. 20, 2007. The entirety of the above-mentioned patent application is hereby incorporated by reference herein and made a part of specification.

BACKGROUND OF THE INVENTION

1. Field of the Invention

The present invention generally relates to a valve, in particular, to an infusion device having a valve for draining a liquid in a flow path within an infusion device.

2. Description of Related Art

FIG. 3 is a view illustrating a flow path in an embodiment of an infusion device according to the prior art. The infusion device transports a mobile phase solution in liquid chromatography. The infusion device 10 allows a plunger 11 to go backward (leftward in the figure) for drawing the mobile phase solution by suction into a pump chamber 12, then allows the plunger 11 to go forward (rightward in the figure) for ejecting the drawn mobile phase solution. Check valves 13 for preventing a reverse flow during the suction/ejection operations are disposed at an upstream (a suction opening) side and a downstream (an ejection opening) side of the pump chamber 12

The mobile phase solution ejected from the infusion device 10 is transported to the downstream side through an analysis flow path. At the downstream side, a sample introduction device 20, a column 30, and a detector 40 are disposed. A sample, as an analysis object, is introduced from the sample introduction device 20 into the analysis flow path through which the mobile phase transported from the infusion device 10 flows. Then, the sample is separated in the column 30 according to components thereof, and detected by the detector 40 for sending out different signals according to properties of the components. On the other hand, in a flow path that branches from the analysis flow path, a pressure sensor 14 for monitoring a pressure of the liquid transported from the infusion device 10 to the analysis flow path, a damper 15 for suppressing a pressure variation of the transported liquid, and a drain valve 16 are disposed. The drain valve 16 is opened when exchanging the mobile phase solutions, so as to exchange the solution within the infusion device 10. Alternatively, the drain valve 16 is opened when releasing the pressure as the pressure sensor 14 senses an abnormal pressure, so as to drain the mobile phase solution transported from the infusion device 10 instead of introducing it into the analysis flow path. The drain valve 16 is normally closed in a blocking state. Patent Document 1 has disclosed a detailed construction of this flow path.

Further, the drain valve 16 is a valve for opening/closing a communication drained from the flow path by a rotation operation. FIG. 2(a) is a sectional view taken along a rotary shaft of a valve shaft. The drain valve 16 is connected thereon with the flow path that branches out from the analysis flow path, and thus the drain valve 16 has a flow inlet 52i and a flow outlet 52o on a main body 51 thereof. On the other hand, a shaft 54 having a valve body 53 made of resin at a front end thereof goes into and out of the space inside the main body 51 by the rotation operation; thus, the shaft 54 is formed into a structure that makes the valve body 53 disposed at the front end of the shaft 54 separated from or connected to the flow inlet 52i. In addition, in order to keep the liquid from leaking from a gap between the shaft 54 and the main body 51 when the drain valve 16 is opened, a ring seal 55 is disposed on the shaft 54. In addition, a knob 56 is disposed to perform the rotation operation on the shaft 54. The knob 56 is fixed by a screw 58 screwed into a screw hole 57 penetrating through the shaft 54. The shaft 54 supported by a screw mechanism 60 of the main body 51 goes in and out by the rotation operation on the shaft 54.

[Patent Document 1] Japanese Patent Laid-Open Publication No. 7-83400

In the structure shown in FIG. 2(a), the shaft 54 is rotated by the rotation operation; hence, the valve body 53 at the front end is rotated following the rotation of the shaft 54. Therefore, the valve body 53 is pressed to the flow inlet 52i while being rotated, and the sealing capability becomes worst. If the rotation operation is performed under the state, in which the valve body 53 abuts against the flow inlet 52i further towards a close direction, a pressing force that presses the valve body 53 towards the flow inlet 52i is applied, thereby enhancing the tightness. However, the flow inlet 52i is rubbed against the valve body 53, in which the valve body 53 becomes deteriorated, and thus the lifespan of the valve body 53 is shortened. For this reason, as shown in FIG. 2(b), the following construction is considered. That is, the shaft 54, a sealing portion 54a including the valve body 53, and a shaft portion 54b are manufactured to be separated from one another and capable of clamping a slip ring 59. Through this construction, the sealing portion 54a does not follow the rotation caused by the rotation operation on the shaft portion 54b, thereby suppressing the abrasion of the flow inlet 52i and the valve body 53.

However, in the construction in FIG. 2(b), when opening the flow path that leads to a waste liquid flow path, the shaft portion 54b is moved to an opposite side (upside in the figure) of the sealing portion 54a, thereby not applying any force to the sealing portion 54a. Thus, the sealing portion 54a remains in the space inside the main body 51, and it takes time to detach the sealing portion 54a. On the contrary, even if the liquid flows out of the infusion device, most of the liquid from the flow inlet 52i flows toward the flow outlet 52o if the extent to which the valve body 53 being separated from the flow inlet 52i equals the extent to which the flow inlet 52i and the flow outlet are spatially communicated. As a result, a separation of the sealing portion 54a from the space inside the main body 51 by pushing the sealing portion 54a upward cannot be expected. Much attention should be paid in the operation since the construction is formed of parts having strictly managed tolerances. Considering such situation, the operator of the device does not carry out the maintenance operation on the drain valve 16 easily, such that something abnormal is likely to occur to the equipment.

In view of the above, the drain valve, the shaft portion, and the sealing portion are preferably disposed to be separated from one another to ensure a degree of freedom in a respective rotation direction thereof, and preferably to ensure a fixed position relationship there-between when moving in a direction along the rotated shaft. Furthermore, a simple processing is expected instead of a complex mechanism.

SUMMARY OF THE INVENTION

Accordingly, the present invention is directed to a valve, which includes a sealing portion having a valve body abutted against a hole to block the hole, and a shaft portion going in and out by being rotated and having a mechanism that makes the sealing portion separated from or connected to the hole.

The sealing portion and the shaft portion are rotatably fastened to each other. Through this construction, a fixed position relationship is established between the shaft portion and the sealing portion when moving in a direction along the rotated shaft while ensuring a degree of freedom in a respective rotation direction thereof.

Specifically, the following construction is ideal. The shaft portion is disposed therein with a through hole along a rotary shaft of the valve. A fastening member is embedded in and inserted into the through hole. Moreover, the fastening member has one end fixed to the sealing portion and the other end fastened to the shaft portion. Specifically, the fastening member is a screw, the portion fixed to the sealing portion is a screw portion, and the portion fastened to the shaft portion is a screw head. The disposition of the through hole along the shaft of the shaft portion can be realized by an ordinary mechanical processing, and the screw rotatably connecting the sealing portion and the shaft portion is a part that is readily available.

EFFECT OF THE INVENTION

According to the valve in the invention of the present application, a sealing ring is not rotated even if a rotation operation is performed; thus the lifespan of the sealing ring is not shortened. Moreover, the sealing ring may follow either the action of going in or out of the shaft and does not remain in the space inside a main body. Concerns about excess being remained will not be an issue in the maintenance operation. The performance of the machine is maintained and the possibility that something abnormal occurs to the machine is reduced. In addition, the present invention can be realized at a low cost without any complex mechanism or special processing. The main body may use the main body in the prior art, and a drain valve disposed on a branch flow path that branches out from a main flow path for guiding the liquid ejected from an infusion device may be disposed thereon with the valve of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
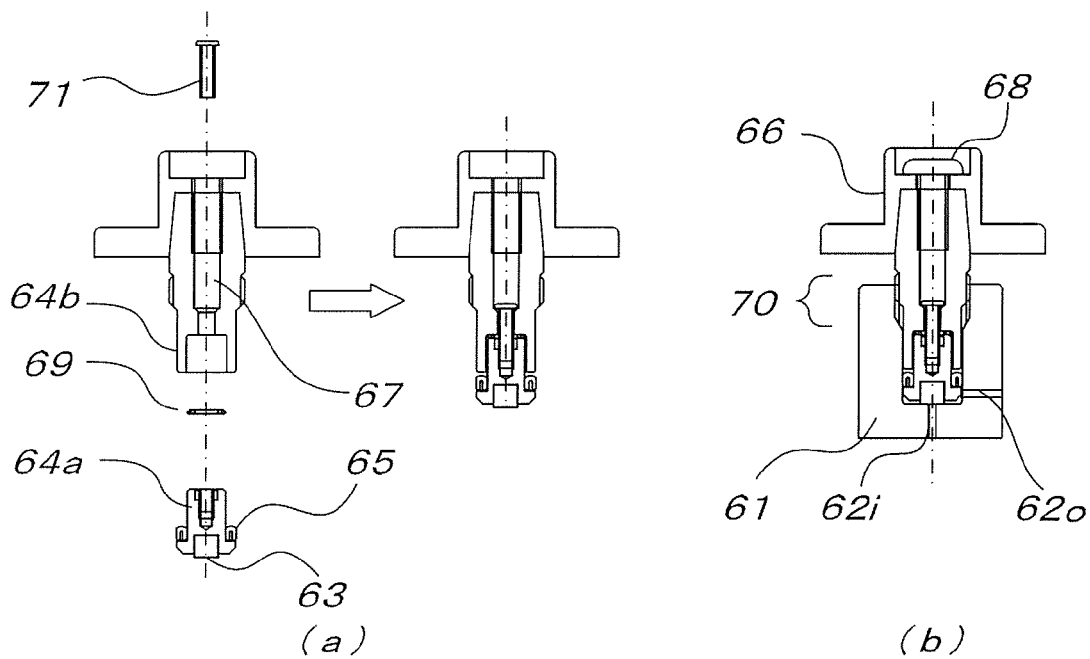
FIG. 1(a), (b) are schematic views of a structure of a valve involved the present invention.
Figure 2:
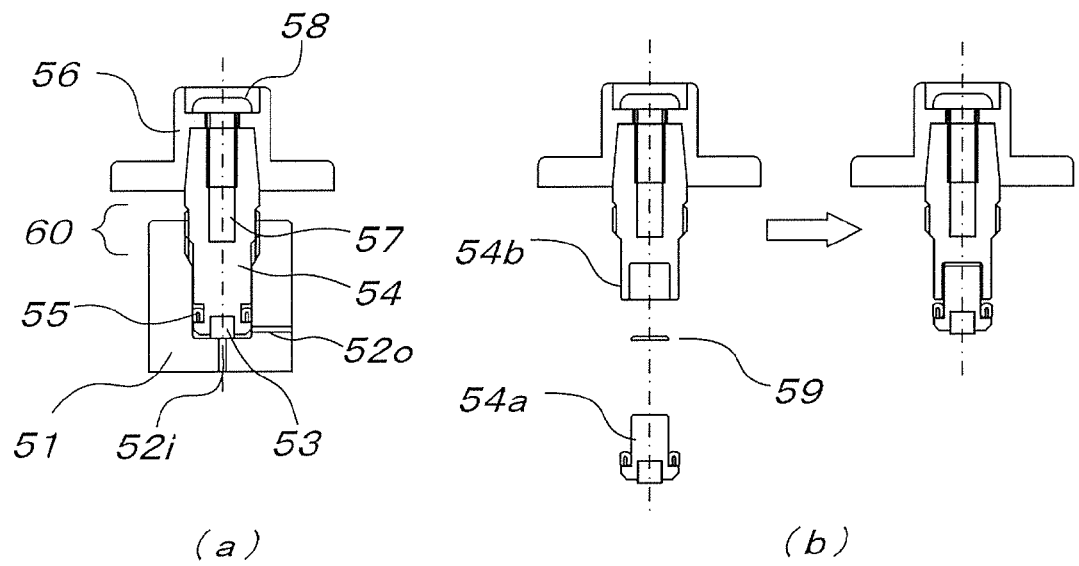
FIG. 2(a), (b) are schematic views of a structure of a valve according to the prior art.
Figure 3:
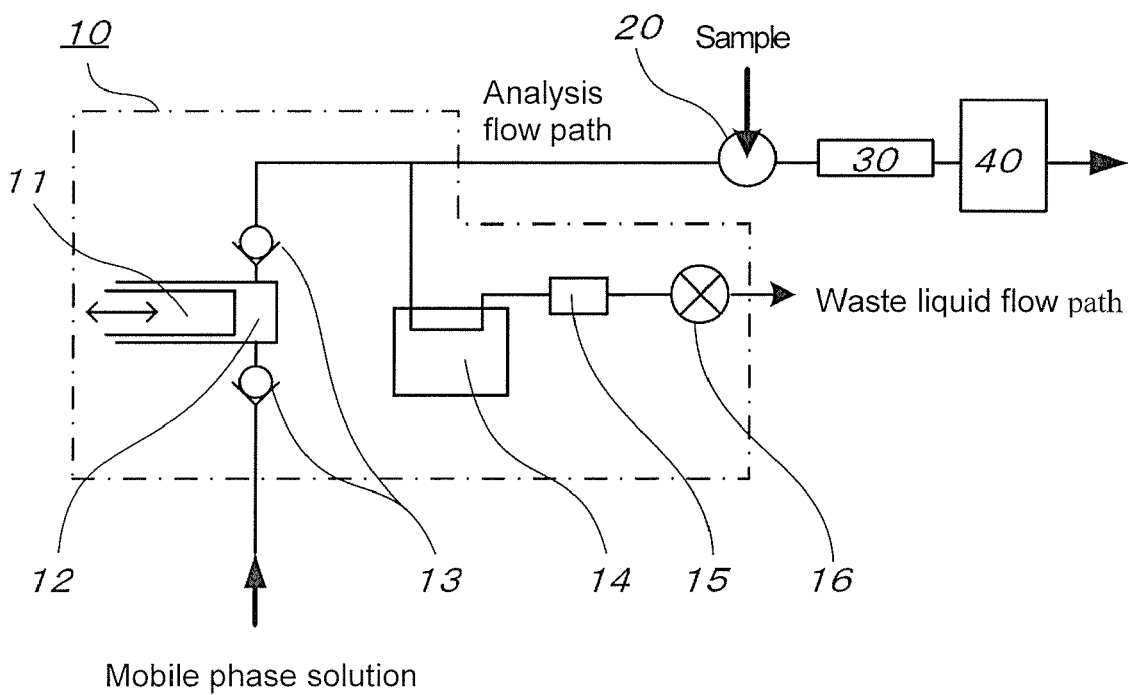
FIG. 3 is a schematic view of an arrangement of a drain valve in the liquid chromatography.

Reference will now be made in detail to the present preferred embodiments of the invention, examples of which are illustrated in the accompanying drawings. Wherever possible, the same reference numbers are used in the drawings and the description to refer to the same or like parts.

The valve involved in the present invention is illustrated below in detail with reference to the drawings.

As shown in FIG. 1(a), in the valve involved in the present invention, a sealing portion 64a and a shaft portion 64b are constructed to be separated from each other. The sealing portion 64a clamps a slip ring 69 and is connected to one end of the shaft portion 64b. A through hole 67 penetrates through the shaft 64b. The slip ring 69 is clamped to connect the shaft portion 64b and the sealing portion 64a by a screw (small) 71 inserted into the through hole 67. A recess may be formed at one end of the shaft portion 64b at one side connected to the sealing portion 64a for a loose insertion of the sealing portion 64a. A central shaft of the through hole 67 is consistent with a rotary shaft of the shaft portion 64b. The through hole 67 is formed of holes of different inner diameters and has a step inside the shaft 64b. The screw (small) 71 is screwed, at a screw portion, to the sealing portion 64a, and no degree of freedom of rotation exists between the screw (small) 71 and the sealing portion 64a. In contrast, the screw (small) 71 is fastened to the shaft portion 64b only at a screw head portion of the screw (small) 71, and a degree of freedom of rotation is maintained there-between.

As viewed from the sealing portion 64a, a knob 66 is disposed at an end portion of an opposite side of the side of the shaft portion 64b. An operation of rotating the shaft portion 64b may be performed by turning the knob 66. Threads are disposed on part of the through hole 67 of the shaft portion 64b. The knob 66 is fixed to the shaft portion 64b by a screw (large) 68.

A ring seal 65 is disposed on a circumference of the sealing portion 64a to prevent the liquid from leaking between the sealing portion 64a and a main body 61 (especially from a screw mechanism 70). When the valve is opened, a shorter distance from a flow inlet 62i till the ring seal 65 may result in a smaller volume of the space communicating the flow inlet 62i and a flow outlet 62o, thus being preferred.

A diameter of a valve body 63 is larger than that of the flow inlet 62i, such that when the valve body 63 abuts against the flow inlet 62i, the flow inlet 62i is covered regardless of the rotation position of the sealing portion 64, and thus the flow inlet 62i may be sealed by being pressed. The valve body 63 is made of resin (for example, poly ether ether ketone (PEEK)). Preferably, the center of the flow inlet 62i or the center of the valve body 63 is consistent with the rotary shaft of the shaft portion 64b, such that the manufacturing thereof is easier.

FIG. 1(b) shows the entire valve. The flow inlet 62i and the flow outlet 62o are disposed on the main body 61. The liquid flows from the flow inlet 62i into the space inside the main body 61 and flows out to the downstream side via the flow outlet 62o through opening the valve (the valve body 63 is separated from the flow inlet 62i). A shaft is embedded in and inserted into the main body 61. The shaft connects the sealing portion 64a and the shaft portion 64b by means of the screw (small) 71. The main body 61 supports the shaft portion 64b by means of the screw mechanism 70 and allows the shaft portion 64b to go in and out by performing a rotation operation on the shaft portion 64b. The valve involved in the present invention is a valve constructed as above. Thus, the shaft portion 64b goes in and out by the rotation operation and the sealing portion 64a goes in and out of the shaft portion 64b in the same fixed relationship. Moreover, the sealing portion 64a may be rotated freely with respect to the shaft portion 64b.

When the valve is closed (the valve body 63 seals the flow inlet 62i), the shaft portion 64b and the sealing portion 64a go forward towards the bottom of the figure by performing the rotation operation on the shaft portion 64b. The valve body 63 at a front end of the sealing portion 64a abuts against the flow inlet 62i. If the rotation operation is further performed to press the sealing portion to the flow inlet 62i, any friction generated by the rotation on a contact surface between the valve body 63 and the side of the flow inlet 62i is greater than the friction generated by the rotation at the junction between the sealing portion 63a and the shaft portion 64b (via the slip ring 69), such that the rotation of the sealing portion 64a does not follow the rotation of the shaft portion 64b. When the valve body 63 is crushed to a certain extent, the flow inlet 62i is sealed. In addition, no further rotation is needed.

When the valve is opened, the shaft portion 64b and the sealing portion 64a go backward towards the top of the figure by the performance of the rotation operation (opposite to the above rotation) on the shaft portion 64b. The sealing portion 64a does not follow the rotation of the shaft portion 64b at first, but follows the rotation of the shaft portion 64b after the friction is weakened when the force is slowly released. When the shaft portion 64b and the sealing portion 64a go backward, the screw head portion of the screw (small) 71 is fastened to the step of the through hole 67, so as to maintain a fixed position relationship between the shaft portion 64b and the sealing portion 64a. Therefore, when the shaft portion 64b is completely detached from the main body 61, the sealing portion 64a is removed from the shaft portion 64b, instead of remaining inside the main body 62.

Considering a pitch between the threads of the screw mechanism 70 of the main body 61 supporting the shaft portion 64b, the material or thickness of the valve body, and the like, the knob 66 is allowed to rotate about 90° to switch the opening and the closing of a flow path. In the regard that the state is confirmed by the sense and vision of "performing the operation" by the operator, the opening and closing, i.e., the switching of the opening/sealing of a flow path, is accomplished preferably by the rotation operation of the knob of about 90°.

The valve constructed in the above manner is disposed as a drain valve at a distal end of the flow path that branches out from an analysis flow path beginning from a liquid chromatography infusion device, and then the required analysis can be performed without considering the exchange of mobile phase or the maintenance operation.

The above embodiment is merely one embodiment of the present invention, and variations or modifications can be made thereto under the theme of the present invention. It is apparent that these variations or modifications are covered by the present invention.

Industrial Applicability

The present invention is applicable to a valve that opens and closes a flow path. The valve in the present invention is most suitable to be used as a drain valve for draining the liquid within an infusion device in the liquid chromatography.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A valve comprising:
   a sealing portion, having a valve body abutted against a hole to block the hole;
   a shaft portion, going in and out by being rotated and having a mechanism that makes the valve body of the sealing portion separated from or connected to the hole,
   wherein the sealing portion and the shaft portion are rotatably fastened to each other and rotate relative to each when the valve body contacts the hole, and the sealing portion and the hole are disposed substantially along a direction of the going in out of the shaft portion, and
   wherein the shaft portion has a through hole with the rotated shaft as a central shaft, a fastening member is embedded in and inserted into the through hole, and the fastening member has one end fixed to the sealing portion and the other end rotatably fastened to the shaft portion.

2. The valve according to claim 1, wherein:
   the fastening member is a screw, the portion fixed to the sealing portion is a screw portion, and the portion fastened to the shaft portion is a screw head.

3. An infusion device, for transporting a liquid by repeated suction and ejection, wherein:
   a branch flow path is disposed, and the branch flow path is a flow path that branches out from a main flow path for guiding the ejected liquid,
   the branch flow path has a valve according to claim 1 at a distal end thereof.

4. An infusion device, for transporting a liquid by repeated suction and ejection, wherein:
   a branch flow path is disposed, and the branch flow path is a flow path that branches out from a main flow path for guiding the ejected liquid,
   the branch flow path has a valve according to claim 2 at a distal end thereof.

* * * * *